United States Patent Office 3,254,123
Patented May 31, 1966

3,254,123
PREPARATION OF 2-AMINO-5-TRIFLUOROMETH-
YL BENZOPHENONES AND INTERMEDIATES
Antonino Focella, Clifton, Benjamin Pecherer, Montclair,
and Leo Henryk Sternbach, Upper Montclair, N.J., assignors to Hoffmann-La Roche Inc., Nutley, N.J., a corporation of New Jersey
No Drawing. Filed Jan. 9, 1963, Ser. No. 250,220
5 Claims. (Cl. 260—566)

The present invention relates to novel chemical processes particularly adapted for the preparation of 2-amino-5-trifluoromethylbenzophenones and to novel intermediates formed in the performance of the said processes. The 2-amino-5-trifluoromethylbenzophenones derived are well suited for use in the preparation of pharmaceutically active 1,4-benzodiazepines.

Heretofore, 2 - amino-5-trifluoromethylbenzophenones have been prepared directly from 2-halo-5-trifluoromethylbenzophenones by the reaction thereof with ammonia. Such a reaction is difficult to control and results in variable and inconsistent yields. It is the object of the present invention to overcome the disadvantages inherent in such a procedure and thus, provide a method of forming the said 2-aminobenzophenones from the 2-halo-5-trifluoromethylbenzophenones in good yields and yet, in the absence of special operating conditions.

In achieving this objective within the purview of the present invention, it has been found that if 2-halo-5-trifluoromethylbenzophenones are reactive with benzylamine to form a 2-benzylamino derivatives of the said 2-halo-5-trifluoromethylbenzophenones and, thereafter, if the said derivatives are debenzylated, good quality 2-amino-5-trifluoromethylbenzophenones are obtained in high yields.

In one aspect, the invention relates to a process which comprises reacting 2-halo-5-trifluoromethylbenzophenones with benzylamine to form 2-benzylamino-5-trifluoromethylbenzophenones and thereafter, debenzylating the last mentioned intermediates to form the desired 2-amino-5-trifluoromethylbenzophenones. The 2-benzylamino-5-trifluoromethylbenzophenones (i.e., compounds of Formula III infra) are novel compounds and are exemplified by 2-benzylamino-5-trifluoromethylbenzophenone and 2-benzylamino-2',5-bis(trifluoromethyl)benzophenone.

In another aspect, the invention relates to a process which includes the steps of reacting 2-halo-5-trifluoromethylbenzophenones with a sufficient molar excess of benzylamine to form benzylimides of 2-benzylamino-5-trifluoromethylbenzophenones, hydrolyzing the resulting compounds to form 2-benzylamino-5-trifluoromethylbenzophenones and debenzylating the last mentioned intermediates to obtain 2-amino-5-trifluoromethylbenzophenones. The benzylimides of 2 - benzylimino-5-trifluoromethylbenzophenones (for example, the benzylimide of 2-benzylamino-5-trifluoromethylbenzophenone) are novel compounds.

The process set out above is illustrated more particularly in the following diagrammatical flow sheet, wherein the symbol R represents a member selected from the group consisting of hydrogen and trifluoromethyl, and X is halogen and, thus, represents a member selected from the group consisting of chlorine, bromine, fluorine and iodine.

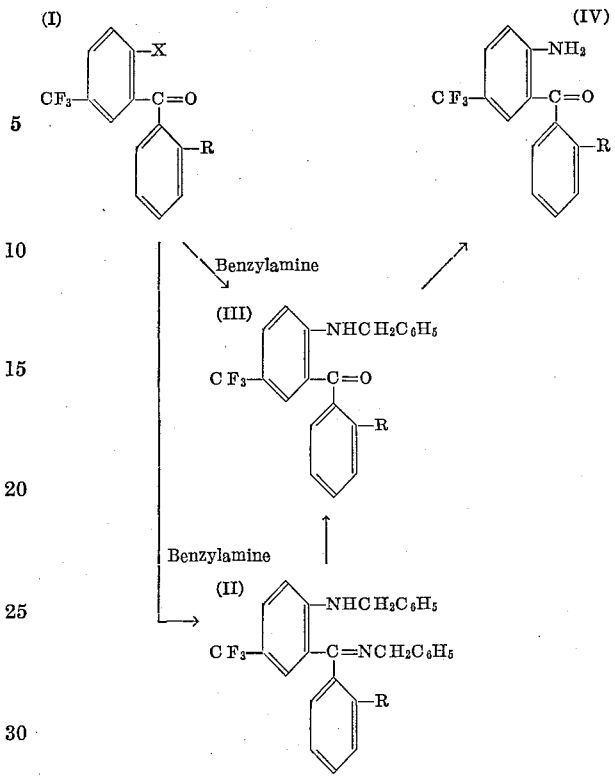

The first stage of the process illustrated above (I→III) comprises forming the intermediate III. This stage, as hereinafter made evident, can be efficaciously accomplished by two different courses of procedure, the amount of benzylamine being determinative of the route.

More particularly, the step (→III) is preferably carried out by reacting not more than about 2 moles of benzylamine with about 1 mole of Compound I. By maintaining the molar ratio at about the stated maximum, the amount of benzylimide of 2-benzylamino-5-trifluoromethylbenzophenone formed during the ensuing reaction is minimized and a maximum yield of 2-benzylamino-5-trifluoromethylbenzophenone (III) is realized.

The step (I→II→III), however, is also an effective route for preparing the 2-amino-5-trifluoromethylbenzophenones. It can be accomplished by employing a quantity of benzylamine in excess of the molar ratio of about 2 to 1 specified above. By this procedure, the benzophenone reacts with the excess benzylamine to form a benzylimide (Compound II). The latter intermediate can be hydrolyzed, i.e. by treatment with an acid reagent, to form Compound III.

It is clear from the above, that when the said molar excess is utilized, the resulting product may, depending upon the excessive amount, comprise a mixture of 2-benzylamino-5-trifluoromethylbenzophenones and benzylimide of 2-benzylamino-5-trifluoromethylbenzophenones. This mixture can be separated into the individual compounds by, for example, a process of recrystallization or, alternatively, subjected to hydrolysis.

The first stage by either route is conveniently effected by heating a mixture of Compound I and benzylamine at a temperature of from 70° to 200° C., preferably from 130° to 150° C. in the presence of an inert solvent which may be benzylamine per se. However, any suitable polar or nonpolar aromatic or nonaromatic diluent such as xylene, benzene, toluene, paraffinic hydrocarbon such as dodecane, and nonreactive halogenated derivatives thereof, as well as mixtures of dioxane and water and the ethers of polyethylene oxides, such as the dimethyl ether of tetraethylene glycol, can be satisfactorily utilized as the said solvent in the first stage. While the benzylamine and the starting compound (I) are preferably employed in a molar ratio of about 2 to 1, it is within the contemplation of the invention to utilize molar ratios of these two ingredients in all proportions. However, for the sake of efficiency, it is not expedient to employ these two reactants in a molar ratio of less than about 1:1.

The second stage (III→IV) is effected by debenzylating the Intermediate III. A convenient method of achieving this comprises subjecting Compound III to hydrogenolysis. Preferably, the hydrogenolysis is accomplished with hydrogen catalytically in the presence of a suitable metal-acid combination. An example of a metal suitable for use in the said combination is palladium. Mineral acids are expediently employed as the acid component of the said combination, with hydrohalic acids being preferred. The hydrogenolysis proceeds in a polar medium, such media being exemplified by glacial acetic acid, and other lower alkanoic acids, lower alkanols such as ethanol, propanol, etc., and aqueous inorganic acids. It should be noted that while a 2-step procedure, i.e. hydrolysis followed by debenzylation, is preferable insofar as the formation of Compound IV from Compound II is concerned, this also can be effected by simultaneously hydrolyzing and debenzylating, i.e. hydrogenating, thereby directly obtaining Compound IV.

The invention is further illustrated by way of the following examples which are illustrative but not limitative thereof. All temperatures given below are in degrees centigrade.

EXAMPLE 1

In a one liter, three-neck, round bottom flask equipped with a stirrer, thermometer and a reflux condenser provided with a drying tube, is placed 99.4 g. of 2-chloro-5-trifluoromethylbenzophenone (0.349 mole), 77 g. of benzylamine (0.719 mole) and 350 ml. of dry xylene. The mixture is stirred and kept just below reflux temperature for 28 hours. The mixture turns pale yellow soon after warming and benzylamine hydrochloride begins to separate after an hour or so. At the end of the heating period, the reaction mixture is cooled, the benzylamine hydrochloride filtered off and washed with a little petroleum ether, B.P. 60°–90°. The filtrate is stripped of solvent in vacuo and the yellow oily residue taken up in 300 ml. of petroleum ether (60°–90°). On chilling below 0°, a pale yellow crystalline solid separates; this is filtered off and dried in vacuo.

To the filtrate is added an equal volume of ether and concentrated hydrochloric acid until the pH is 5. After standing for four hours, the benzylamine hydrochloride which has precipitated out is filtered off. The filtrate is washed with water until the wash liquor is neutral, then dried. After stripping the solvent, the residual oil is taken up in petroleum ether and the crystallization of the second crop allowed to take place at 0°. This is filtered off and freed of solvent, M.P. 60–66°. A third crop, melting similarly, can be taken by further concentration and chilling of the mother liquor.

A single recrystallization of the composite of all three crops from petroleum ether gave 2-benzylamino-5-trifluoromethylbenzophenone, melting at 70–74°.

*Preparation of 2-amino-5-trifluoromethylbenzophenone*

Nine grams of 2-benzylamino-5-trifluoromethylbenzophenone is dissolved in 150 ml. of glacial acetic acid and 3 ml. of concentrated hydrochloric acid. To this is added 0.5 gram of 10% palladium on charcoal and the mixture shaken under hydrogen at 50 lb. pressure. In the course of 100 minutes, the theoretical quantity of hydrogen is taken up. At this point, the catalyst is filtered off and the solvent stripped in vacuo. The residue 2-amino-5-trifluoromethylbenzophenone is recrystallized from 60°–90° petroleum ether.

*Alternate procedures for the preparation of 2-amino-5-trifluoromethylbenzophenone*

Six grams of 2-benzylamino-5-trifluoromethylbenzophenone and 3.8 g. of stannous chloride dihydrate are refluxed with a mixture of 70 ml. of constant boiling hydrobromic acid and 40 ml. of acetic acid for 45 minutes with stirring. When cool, the solvent is removed in vacuo. The dry residue is taken up in 25 ml. of ethyl acetate, the resultant solution washed twice with an equal volume of 0.1 N HCl, then with water until neutral. After stripping the ethyl acetate, the residual solid is recrystallized from petroleum ether, B.P. 60°–90°, to obtain the desired 2-amino-5-trifluoromethylbenzophenone, M.P. 77–79°.

The above procedure was repeated except that 3.2 g. of anhydrous stannous chloride was employed in place of the stannous chloride dihydrate. By proceeding accordingly, the desired 2-amino-5-trifluoromethylbenzophenone was obtained.

Six grams of 2-benzylamino-5-trifluoromethylbenzophenone is dissolved is 65 ml. of toluene in a 100 ml. flask provided with a stirrer, reflux condenser and gas inlet tube. The contents are warmed and a stream of anhydrous hydrogen bromide is passed into the solution which begins to deepen in color at about 40°. Gas is passed into the solution while maintaining the same at reflux (110°) for three hours. The solution is then cooled, diluted with an equal volume of benzene, and washed free of acid with water. Removal of the solvent leaves a reddish oily residue. This residue is taken up in petroleum ether, B.P. 60°–90°, and crystallized by chilling. After several more recrystallizations from petroleum ether, there is obtained 2-amino-5-trifluoromethylbenzophenone melting at 70°–72°.

Two grams of 2-benzylamino-5-trifluoromethylbenzophenone is refluxed with 45 ml. of acetic acid and 12 ml. of 48% hydrobromic acid for 45 minutes. The excess acids are then removed in vacuo and the residue taken up in ethyl acetate. The resultant solution is washed with water, dilute ammonia and dried. Removal of the ethyl acetate yielded 2-amino-5-trifluoromethylbenzophenone that melted at 70°–72°.

EXAMPLE 2

Fourteen and two-tenths g. of 2-chloro-5-trifluoromethylbenzophenone (0.05 mole) is heated just below reflux temperature with 35.5 g. of benzylamine (0.33 mole) in 50 ml. of xylene for 28 hours. When cool, the benzylamine hydrochloride is filtered off and washed with a little petroleum ether. The filtrate is steam distilled to remove solvent and excess benzylamine. From the steam-still-pot residue, the oil is extracted with benzene. The benzene extract is dried, concentrated, and the residual viscous oil taken up in 50 ml. of petroleum ether. On standing in the cold, a white crystalline solid is obtained after a period of several days. This is filtered off and subjected to several recrystallizations from petroleum ether until the melting point is 134°–135°. This substance is a benzylimide of 2-benzylamino-5-trifluoromethylbenzophenone.

The benzylimide of 2-benzylamino-5-trifluoromethylbenzophenone is treated with 50% sulfuric acid and toluene at the reflux temperature and, thus, the benzylaminoketone is obtained. The latter may be treated in the manner set out above to form 2-amino-5-trifluoromethylbenzophenone.

EXAMPLE 3

In a one liter, three-neck flask equipped with a stirrer and a reflux condenser topped by a drying tube were placed 56 g. of 2-chloro-2′,5-bis(trifluoromethyl)-benzophenone (0.16 mole), 36 g. of benzylamine (0.336 mole) and 350 ml. of xylene. The mixture was stirred and heated just below its reflux temperature for 18 hours; shortly after warming, the mixture turned yellow and after about an hour, benzylamine hydrochloride separated. After the heating period, the mixture was cooled in an ice bath and the benzylamine hydrochloride filtered off and washed with 100 ml. of petroleum ether. From the filtrate, the solvent was stripped, the sirupy yellow residue taken up in 200 ml. of petroleum ether, and the resulting solution chilled in the refrigerator until crystallization was complete.

The yellow crystalline product was filtered off and washed with a little petroleum ether. There was obtained a yellow crystalline material melting at 83°–86°, namely, 2-benzylamino-2′,5-bis(trifluoromethyl)benzophenone.

Eight and one-half g. of 2-benzylamino-2′,5-bis(trifluoromethyl)benzophenone is dissolved in 155 ml. of glacial acetic acid and 3 ml. of concentrated hydrochloric acid. To this is added 0.5 g. of 10% palladium on charcoal and the mixture shaken under hydrogen at approximately 50 lbs. pressure. In the course of 2 hours, the theoretical quantity of hydrogen is taken up. After filtering off the catalyst, the solvent and excess hydrochloric acid are stripped in vacuo. The residue is dissolved in 30 ml. of ethyl acetate; this solution is then washed with dilute ammonia followed by two washes with distilled water. After stripping the ethyl acetate, the residue is recrystallized from 60 ml. of 60°–90° petroleum ether to obtain 2-amino-2′,5-bis(trifluoromethyl)benzophenone in the form of yellow crystals melting at 73°–75°.

We claim:
1. A process which comprises reacting a compound of the formula

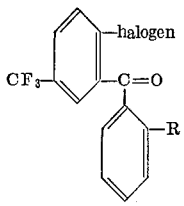

wherein R is selected from the group
consisting of hydrogen and trifluoromethyl with benzylamine in the presence of an inert solvent medium and debenzylating the so-formed 2-benzylamino derivative by catalytic hydrogenation in the presence of a hydrogenation catalyst and a polar medium selected from the group consisting of lower alkanoic acids, lower alkanols and aqueous inorganic acids whereby to obtain a compound of the formula

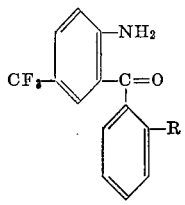

wherein R is as set out above.

2. A process which comprises reacting a first compound of the formula

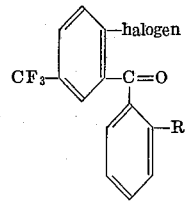

wherein R is selected from the group
consisting of hydrogen and trifluoromethyl with benzylamine in the presence of an inert solvent medium and in an amount sufficient to obtain a second compound of the formula

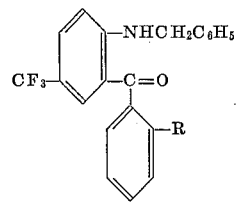

wherein R is as set out above and debenzylating the said second compound by catalytic hydrogenation in the presence of a hydrogenation catalyst and a polar medium selected from the group consisting of lower alkanoic acids, lower alkanols and aqueous inorganic acids to thereby obtain a third compound of the formula

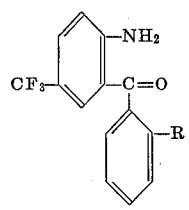

wherein R is as set out above.

3. A process as defined in claim 2 wherein the benzylamine and the first compound are employed in a molar ratio of about 2:1.

4. A process which comprises reacting benzylamine and 2-halo-5-trifluoromethylbenzophenone in a molar ratio in excess of 2:1 in the presence of an inert solvent medium, hydrolyzing the so-formed benzylimide of 2-benzylamino-5-trifluoromethylbenzophenone with an acid agent to obtain 2-benzylamino-5-trifluoromethyl-benzophenone and debenzylating the latter by catalytic hydrogenolysis in the presence of a hydrogenation catalyst and a polar medium selected from the group consisting of lower alkanoic acids, lower alkanols and aqueous inorganic acids.

5. Benzylimide of 2-benzylamino-5-trifluoromethylbenzophenone.

References Cited by the Examiner
UNITED STATES PATENTS

| | | | |
|---|---|---|---|
| 1,946,058 | 2/1934 | Britton et al. | 260—570 |
| 2,063,868 | 12/1936 | Britton et al. | 260—566 |
| 2,231,067 | 2/1941 | Hammond et al. | 260—570 |
| 2,863,920 | 12/1958 | Welch | 260—566 |
| 2,914,560 | 11/1959 | Robertson | 260—566 |
| 3,057,921 | 10/1962 | Coleman et al. | 260—570 |

(Other references on following page)

FOREIGN PATENTS 69,006 10/1892 Germany.
202,727 5/1939 Switzerland.

OTHER REFERENCES

Birkhofer, Ber. Deut. Chem., vol. 75, pp. 429–441 (1942).

Brasen et al., J.A.C.S., vol. 83, pp. 3125–3138 (1961).

Buck et al., J.A.C.S., vol 63, pp 1964–1966 (1941).

Francis, J. Chem. Soc. (London), vol. of 1899, pp. 865–871.

Reddelien, Ber. Deut. Chem., vol. 53, pp. 334–340 (1920).

The Patent Journal of South Africa, p. 31, Patent No. 604,396 (1961).

CHARLES B. PARKER, *Primary Examiner.*

IRVING MARCUS, *Examiner.*

FLOYD D. HIGEL, *Assistant Examiner.*